(12) United States Patent
Yassin

(10) Patent No.: US 6,221,244 B1
(45) Date of Patent: Apr. 24, 2001

(54) SWIMMING POOL CHLORINATOR WITH ADJUSTABLE SLITS

(76) Inventor: Ihssan F. Yassin, 1154 Acadia Pl., Ventura, CA (US) 93003

( * ) Notice: Subject to any disclaimer, the term of this patent is extended or adjusted under 35 U.S.C. 154(b) by 0 days.

(21) Appl. No.: 09/630,087

(22) Filed: Aug. 1, 2000

(51) Int. Cl.⁷ ..................................................... E04H 4/16
(52) U.S. Cl. ...................... 210/169; 210/205; 422/266; 422/269; 137/268
(58) Field of Search ............................. 210/169, 198.1, 210/205, 206; 422/269, 270, 271, 275, 276, 266; 137/268; 15/1.7

(56) References Cited

U.S. PATENT DOCUMENTS

| | | | |
|---|---|---|---|
| 2,332,030 | * | 10/1943 | Toronto . |
| 3,860,394 | * | 1/1975 | Tepas, Jr. et al. . |
| 4,798,707 | * | 1/1989 | Thomas et al. . |
| 5,350,509 | * | 9/1994 | Nelson . |
| 5,476,116 | * | 12/1995 | Price et al. . |
| 5,665,227 | * | 9/1997 | Watt . |
| 6,065,690 | * | 5/2000 | O'Brien . |

FOREIGN PATENT DOCUMENTS

0555600  *  8/1993  (EP) .

* cited by examiner

Primary Examiner—Duane Smith
Assistant Examiner—Fred Prince
(74) Attorney, Agent, or Firm—Jack C. Munro

(57) ABSTRACT

A swimming pool chlorinator that utilizes a cylindrical housing that has an internal chamber. Within the internal chamber is concentrically mounted in a close fitting manner a valve member. The sidewall of the housing has a series of elongated slits and also the valve member has a series of similar elongated slits. The housing has mounted thereon at least one suction cup with the suction cup to be securable to a swimming pool wall surface or other surfaces associated with a swimming pool and beneath the surface of the water in the pool. Within the internal chamber of the housing is located one or more chlorine tablets. The valve member is to be adjusted relative to the housing so that the slits of the housing are unrestricted permitting free flow of water through the housing or the slits are restricted partially thereby limiting the amount of flow of water through the internal chamber. As the water is conducted through the internal chamber, the chlorine tablet is dissolved within the water which chlorinates the water of the swimming pool when this water is conducted exteriorly of the housing.

6 Claims, 2 Drawing Sheets

SWIMMING POOL CHLORINATOR WITH ADJUSTABLE SLITS

BACKGROUND OF THE INVENTION

1) Field of the Invention

The subject matter of this invention pertains to a device for introducing a chemical into a pool of liquid and more particularly to a chlorinator for a swimming pool.

2) Description of the Prior Art

In order to keep a swimming pool sanitary and to keep algae from growing within the swimming pool, it is necessary to add chlorine on a regular basis to the swimming pool water. The vast majority of swimming pool chlorinators are designed to supply chlorine on an automatic basis by adding chlorine over a period of time. One way in which chlorine can be added over a period of time is by utilizing of a tablet that is designed to dissolve at a certain rate. Normally, these tablets take a period of days in order to completely dissolve.

There are several different types of chlorinators that use dissolving tablets. One particular type of chlorinator comprises a floating dispenser where the dispenser floats around the swimming pool with the tablet or tablets contained within the dispenser and with the dissolving of the tablet to chlorinate the water of the swimming pool. However, one problem with a floating dispenser is that it commonly moves to one particular location of the swimming pool and stays in that location. The result is that the chlorine concentration within the swimming pool near the chlorinator is substantially greater than in other regions of the pool.

Another form of chlorinator is one that is integrated in conjunction with the water circulation heating and filtration system of the swimming pool. This type of chlorinator provides for injecting of controlled amounts of chlorinating chemicals into the circulating water and hopefully will achieve a more uniform distribution of chlorine throughout the pool. The chemicals again are often solid tablets or sticks of chlorine containing salts. This type of chlorinator causes the recirculating water to flow over the tablets or the sticks with the tablets or sticks to gradually dissolve. The chlorine concentration can be regulated by controlling the flow rate of the circulating water past the sticks or tablets. However, also with this type of chlorinator, even chlorination throughout the swimming pool is almost never achieved. There always seems to be at least one area of the swimming pool that is not receiving an adequate amount of chlorine.

SUMMARY OF THE INVENTION

One of the primary objectives of the present invention is to construct a spot chlorinator which can be used to apply chlorine to a particular area of a swimming pool with this type of chlorinator to be used in conjunction with other chlorinating systems such as a floating chlorinator or a chlorinator that is mounted directly in conjunction with the recirculating water.

The chlorinator of the present invention comprises a housing, generally cylindrical in configuration, having an exterior surface. Attached to that exterior surface is at least one suction cup. The exterior surface also includes a series of elongated slits. Between each directly adjacent pair of slits is a strip which is part of the wall surface of the housing. The width of each strip is precisely equal to the width of each slit. The housing includes an internal compartment within which is adapted to be located one or more chlorine tablets. A valve member in the form of a tubular sleeve is mounted within the internal chamber in a close conforming manner to the interior wall of the housing. The tubular sleeve is to be pivotally adjustable relative to the housing. The tubular sleeve also includes a similar pair of elongated slits which are the same size as the slits within the housing and are spaced apart the same distance. By pivoting of the valve member, the elongated slits within the housing can be located entirely open or can be completely closed or can be partially open depending upon the position of the valve member relative to the housing. Water is to be conducted through the housing within the internal chamber and then exteriorly of the housing thereby becoming chlorinated by the dissolving of the chlorine tablet or tablets.

Another objective of the present invention is to construct a swimming pool chlorinator which is simple in construction and can be manufactured relatively inexpensively and thereby sold to the ultimate consumer at an inexpensive price.

Another objective of the present invention is to construct a chlorinator which can be quickly and easily mounted on the sidewall surface of a swimming pool in any desired location within the swimming pool and also can be easily and quickly removed from the swimming pool when such is desired.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE PREFERRED EMBODIMENT

Figure 1:
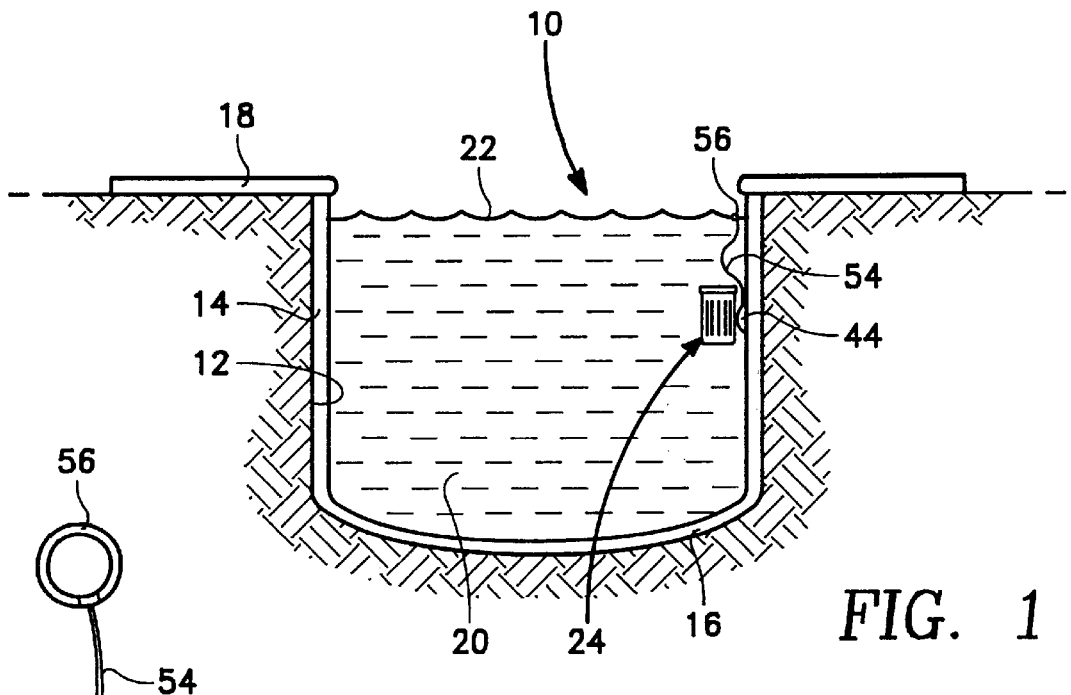
FIG. 1 is a schematic cross-sectional view depicting usage of the chlorinator of the present invention in conjunction with a swimming pool.
Figure 2:
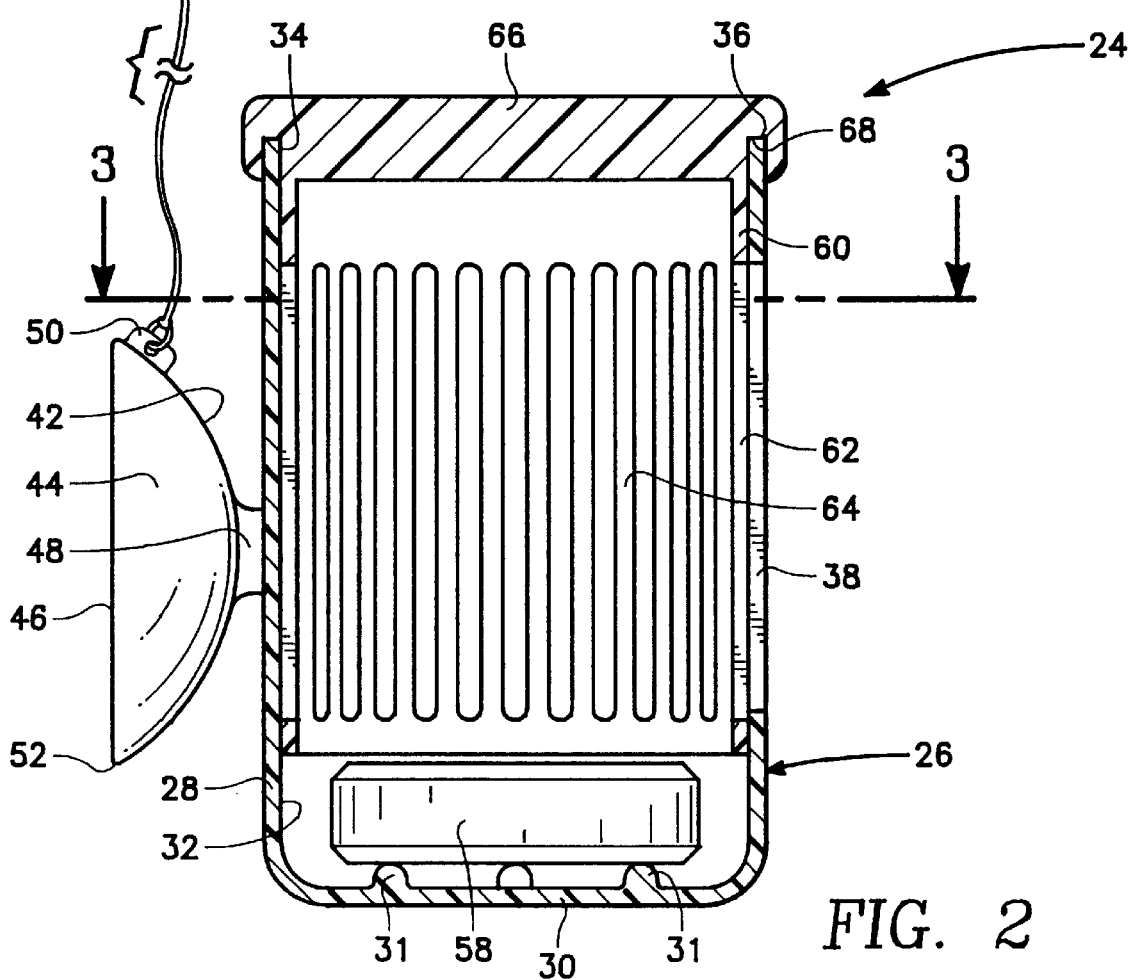
FIG. 2 is a side elevational view, partly in cross-section, of the chlorinator of the present invention.

Referring particularly to the drawings, there is shown in FIG. 1 a swimming pool 10 that is formed within a cavity 12 within the ground. The swimming pool 10 has a wall surface 14 and a floor 16. Surrounding the swimming pool 10 is a coping 18. The swimming pool 10 is to be filled with water 20 which has a surface 22. Chlorinator 24 of this invention is to be installed generally on the wall surface 14 beneath the surface 22.

The chlorinator 24 comprises a cylindrically shaped housing 26. The cylindrically shaped housing 26 includes a sidewall 28 and a closed bottom 30. The housing 26 includes an internal chamber 32. The housing 26 has an open upper end 34 which is enclosed by an annular sidewall edge 36.

Longitudinally formed within the housing 26 are a series of elongated slits 38. There are twenty-one in number of the slits 38 located circumferentially around the housing 26. Each of the slits 38 are of the same width and separating each directly adjacent pair of slits 38 is a thin strip 40 of the housing 26. The width of each strip 40 is to be the same as the width of each slit 38. Normally, the slits 38 will generally be in the range of four to five inches in length with the overall length of the housing being in the range of eight to ten inches.

Fixedly mounted onto the housing 26 by a connection member 48 is a rear surface 42 of a suction cup 44. The suction cup 44 will normally be constructed of a rubber or a flexible plastic material. The suction cup 44 has a front surface 46 which is to be placed against the sidewall 14. By manually pressing of the housing 26 toward the sidewall 14, the suction cup 44 is deformed and squashed against the sidewall 14. Upon manual release of the housing 26, there is created a vacuum between the front surface 46 and the sidewall 14 which functions to retain in position the chlorinator 24 on the sidewall 14.

Integrally mounted on the rear surface 42 is a protruding tab 50 which is located directly adjacent the peripheral edge 52 of the suction cup 44. Connecting with the protruding tab 50 is the inner end of a lanyard 54 with the outer end of the lanyard being secured to a float ring 56. The lanyard 52 would normally be no more than a few inches in length. The purpose of the float ring is to float on the surface 22. Normally, the chlorinator 24 of this invention will be installed just beneath the surface 22 so the lanyard 54 need not be any more than a few inches in length. The purpose of the float ring 56 and the lanyard 54 is that when the suction 44 is installed in position against the sidewall 14, and it is desired to remove the chlorinator 24, a user can grasp the float ring 56 and yank such which will cause the peripheral edge 52 to be lifted from the sidewall 44 breaking of the holding vacuum which will then release the chlorinator 24 and permit such to be removed from the swimming pool 10.

Within the internal chamber 32 there is to be located one or more chlorine tablets 58. The chlorine tablet or tablets 58 will be located on protrusions 31 which are mounted directly against the bottom 30. The protrusions 31 function to have the water 20 be subjected to all sides of the tablet 58 facilitating its dissolving. The tablet or tablets 58 would normally be located within the internal chamber 32 and not be attached directly to the bottom 30. It is to be understood that the chlorine tablets 58 will be dissolvable, and when dissolving will release chlorine within the water 20 that is conducted into and out of the internal chamber 32.

Figure 3:
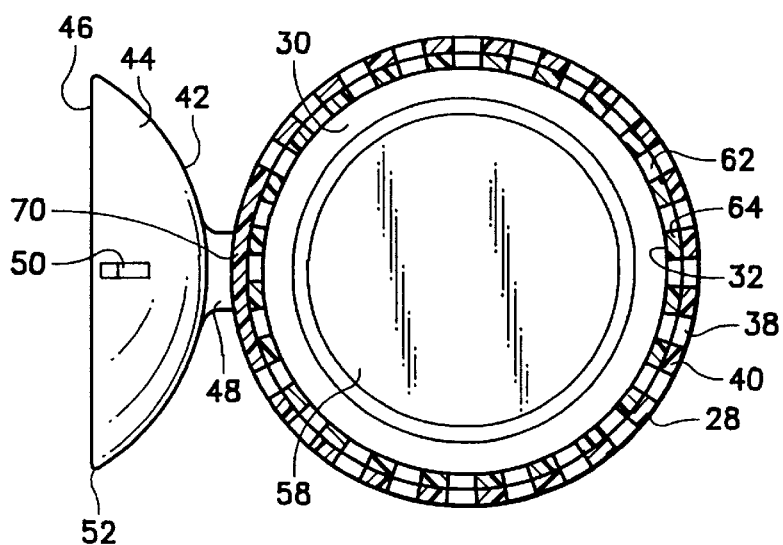
FIG. 3 is a cross-sectional view taken along line 3—3 of FIG. 2 showing the chlorinator in the position of maximum flow of water through the chlorinator.
Figure 4:
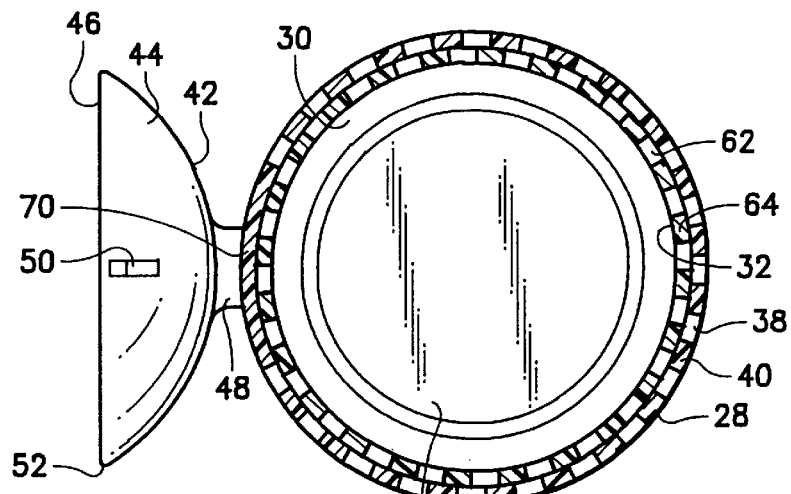
FIG. 4 is a view similar to FIG. 3 but showing the chlorinator in the position of approximately fifty percent flow of water through the chlorinator.
Figure 5:
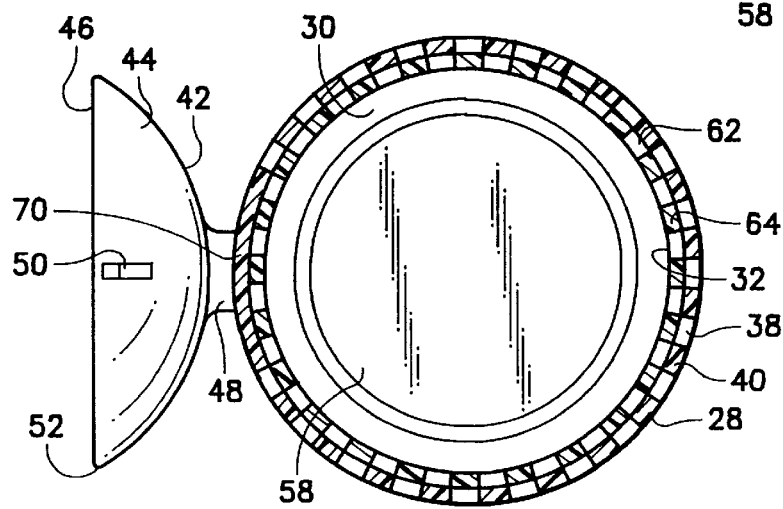
FIG. 5 is a view similar to FIG. 3 but showing the chlorinator in the completely closed position with no flow of water being conducted through the chlorinator.

It very well may be desirable to control the amount of water that is conducted through the internal chamber 32 thereby controlling the amount of chlorine that is being dissolved within the water 20. In order to achieve this, there is used a valve member in the form of a sleeve 60 that is shorter in length than the housing 28 and actually terminates just beyond the lower end of the slits 38. The sleeve 60 also includes a similar series of slits 62 with there being a strip 64 being located between each directly adjacent pair of the slits 62. The width of each of the slits 62 is to be identical and to be also equal to the width of each of the strips 64. The width of each of the slits 62 is to be the same as the slits 38 with the strips 64 being also the same as the width of the strips 40. The upper end of the sleeve 60 is mounted onto a cap 66. The bottom surface of the cap 66 includes an annular groove 68. The annular edge 36 is to rest within the annular groove 68 in a close conforming manner with the sleeve 60 resting within the internal chamber 32 in a close fit relationship with the housing 28. Manual turning of the cap 66 will result in pivoting of the sleeve 60 relative to the housing 28. The annular groove 66 forms a close but yet freely pivotable connection with the annular edge 36. However, upon the sleeve 60 being released and not pivoting, the sleeve 60 will remain in its established position relative to the housing 28. The sleeve 60 can be adjusted so that the slits 38 and 62 align with each other, as shown in FIG. 3, which will permit maximum flow of the water 20 through the internal chamber 32 and hence achieve maximum dissolving of the chlorine tablet 58. The sleeve 60 can also be adjusted to a partial position, as shown in FIG. 4, where approximately fifty percent flow is being obtained with each strip 64 partially blocking a slit 38. Additionally, when it has been decided that an adequate amount of chlorine has been released within the pool 20 and that no further chlorine needs to be added, the cap 66 could be pivoted so that each strip 64 will block a slits 38. It is to be understood that at any one give time there is only strip 64 that blocks a slit 38. There are twenty-four in number of the slits 62 while there are only twenty-one in number of the slits 38 as previously mentioned. One of the slits 62 will be blocked by housing member 70 which connects with the connection member 48. Housing member 70 causes the number of the slits 38 to be less than the number of the slits 62.

It is to be understood that the cap 66 can be grasped and the sleeve 60 physically removed from the internal chamber 32. This will permit the insertion of one or more of the tablets 58. The chlorinator 24 can be installed at any desired position on the sidewall 14 of the swimming pool 10. The chlorinator 24 would normally be installed just a matter of two or three inches below the surface 22. It is to be considered to be within the scope of this invention that within the swimming pool 10 there may be mounted a plurality of the chlorinators 24 located at spaced locations throughout the swimming pool 10.

It is estimated that about sixty-five percent of the existing swimming pools have under chlorinated areas which are areas prone to growing of algae. These under chlorinated areas are due to decreased sunlight exposure caused by shade of trees and other tall structures located near the swimming pool. Also, under chlorinated areas can be caused by poor design of the water circulation system.

The chlorinator of this invention, instead of being attached to the wall surface of the swimming pool, could be attached to the automatic sweeper for the swimming pool. As the automatic sweeper travels throughout the swimming pool, chlorination of the water will occur with this chlorination being applied at the bottom of the pool. All other chlorinators apply the chlorinated water adjacent the surface of the swimming pool.

The present invention may be embodied in other specific forms without departing from the essential attributes thereof. Reference should be made to the appending claims rather than the foregoing specification as indicating the scope of the invention.

What is claimed is:

1. A swimming pool chlorinator comprising:

a housing having an internal chamber, said internal chamber adapted to receive a chlorine tablet to be dissolved in water, said housing having a sidewall, said sidewall having a series of first slits;

a valve member mounted on said housing, said valve member having a series of second slits, said valve member being movable relative to said housing, said second slits being located directly adjacent said first slits, said second slits being locatable to be misaligned from said first slits to block or partially block said first slits and prevent or decrease flow of liquid into and out of said internal chamber, said second slits being locatable to be aligned with said first slits to permit flow of liquid into and out of said internal chamber; and suction cup mounting means attached to said housing, said suction cup mounting means for temporary fixing of said housing to a structure associated with a swimming pool.

2. The swimming pool chlorinator as defined in claim 1 wherein:

said housing being cylindrical.

3. The swimming pool chlorinator as defined in claim 2 wherein:

said valve member being cylindrical, said valve member being concentrically mounted relative to said housing.

4. The swimming pool chlorinator as defined in claim 2 wherein:

said valve member being mounted within said internal chamber.

5. The swimming pool chlorinator as defined in claim 4 wherein:

said valve member being pivotable relative to said housing.

6. The swimming pool chlorinator as defined in claim 1 including:

said suction cup mounting means including a suction cup, said suction cup having a peripheral surface, a protruding tab attached to said suction cup directly adjacent said peripheral surface, a lanyard attached to said protruding tab with an opposite end of said lanyard being attached to a float ring, said float ring being adapted to float on the surface of water within a swimming pool when said suction cup is installed on a structure and located beneath the surface of the swimming pool.

* * * * *